(12) United States Patent
Brunell

(10) Patent No.: US 6,823,253 B2
(45) Date of Patent: Nov. 23, 2004

(54) METHODS AND APPARATUS FOR MODEL PREDICTIVE CONTROL OF AIRCRAFT GAS TURBINE ENGINES

(75) Inventor: Brent Jerome Brunell, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 10/306,433

(22) Filed: Nov. 27, 2002

(65) Prior Publication Data

US 2004/0102890 A1 May 27, 2004

(51) Int. Cl.⁷ .............................................. G06F 19/00
(52) U.S. Cl. .......................................... 701/100; 700/30
(58) Field of Search .............................. 701/100; 700/29, 700/30, 31

(56) References Cited

U.S. PATENT DOCUMENTS 6,063,129 A * 5/2000 Dadd et al. .................... 703/7
6,169,981 B1   1/2001 Werbos
6,185,470 B1   2/2001 Pado et al.
6,208,914 B1   3/2001 Ward et al.
6,522,991 B2 * 2/2003 Banaszuk et al. ........... 702/138
6,532,454 B1   3/2003 Werbos
2003/0055563 A1  3/2003 Lars et al.

OTHER PUBLICATIONS

Banaszuk et al.; Adaptive control of combustion instability using extreme-seeking; Proc. of the American Control Conf.; Chicago, IL; Jun. 2000; pp. 416–422.*

* cited by examiner

*Primary Examiner*—Michael J. Zanelli
(74) *Attorney, Agent, or Firm*—Armstrong Teasdale LLP

(57) ABSTRACT

A method of designing the operations and controls of a aircraft gas turbine engine includes generating an operations model for the gas turbine include at least one objective function, defining operations and control constraints for the operations model of the gas turbine, and providing an online dynamic optimizer/controller that dynamically optimizes and controls operation of the gas turbine using model predictive control based on the operations model and the operations and control constraints using an Extended Kalman Filter for estimation.

20 Claims, 2 Drawing Sheets

METHODS AND APPARATUS FOR MODEL PREDICTIVE CONTROL OF AIRCRAFT GAS TURBINE ENGINES

BACKGROUND OF THE INVENTION

This invention relates generally to aircraft engine power management schemes and more particularly, to methods and apparatus for nonlinear model predictive control of an aircraft gas turbine.

Gas turbines are used in different environments, such as, for example, but not limited to, providing propulsion as aircraft engines and for power generation in both land based power systems and sea borne power systems. The gas turbine model considered is a low bypass, two rotor, turbojet with a variable exhaust area that would be used in military aircraft applications. During normal operation this turbine experiences large changes in ambient temperature, pressure, Mach number, and power output level. For each of these variations the engine dynamics change in a significant nonlinear manner. Careful attention is typically paid by the controller during engine operation to ensure that the mechanical, aerodynamic, thermal, and flow limitations of the turbo machinery is maintained. In addition, the control authority is restricted by the actuator rate and saturation limits. Current technology solves this nonlinear constrained problem using many SISO linear controllers in concert that are gain scheduled and min/max selected to protect against engine limits. While the existing methods have many merits, there exists a need to solve the problem using nonlinear model predictive control (NMPC), which handles the nonlinearities and constraints explicitly and in a single control formulation.

BRIEF DESCRIPTION OF THE INVENTION

In one aspect, a method of designing the operations and controls of an aircraft gas turbine engine is provided. The method includes generating an operations model for the gas turbine, generating at least one objective function, defining operations and control constraints for the operations model of the gas turbine, and providing an online dynamic optimizer/controller that dynamically optimizes and controls operation of the gas turbine using model predictive control based on the operations model and the operations and control constraints using an Extended Kalman Filter for estimation.

In another aspect, a system for designing the operations and controls of an aircraft gas turbine engine is provided. The system includes a computing unit with an input unit for generating an operations model for the aircraft gas turbine engine, generating at least one objective function and for defining operations and controls constraints for the operations model of the aircraft gas turbine engine, and a dynamic online optimizer/controller configured to dynamically optimize and control operation of the gas turbine using model predictive control based on the operations model and the operations and control constraints using an Extended Kalman Filter for estimation.

In yet another aspect, a non-linear model-based control method for controlling propulsion in a aircraft gas turbine engine is provided. The method includes a) obtaining information about the current state of the engine using an Extended Kalman Filter, b) updating model data information about the engine in an model-based control system to reflect the current state of the engine, c) determining the optimal corrective action to take given the current state of the engine, the objective function, and the constraints of the engine, d) outputting a control command to implement the optimal corrective action, and e) repeating steps a)–d) as necessary to ensure the performance of the engine is optimized at all times.

DETAILED DESCRIPTION OF THE INVENTION

First is discussed the gas turbine or plant and how it is modeled. Then a simplified model is introduced that will be used inside the control and the state estimator. In the following section a novel NMPC formulation is presented.

Figure 1:
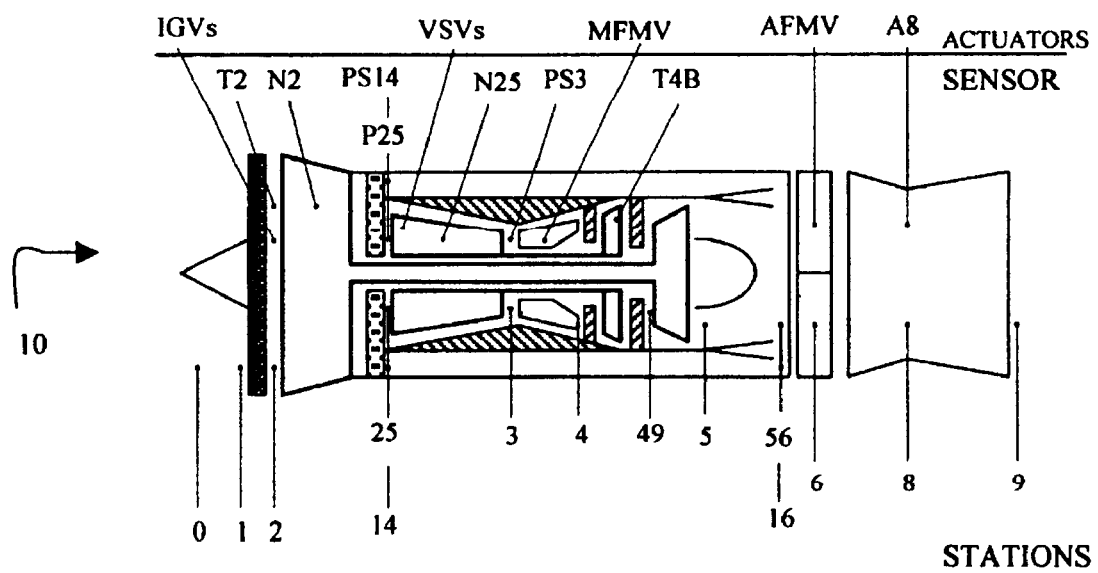
FIG. 1 illustrates a schematic of a layout of an engine.

GLOSSARY
CLM—Component Level Model
EKF—Extended Kalman Filter
NMPC—Nonlinear Model Predictive Control
SRTM—Simplified Real Time Model
MODEL VARIABLES
Actuation Inputs
 A8DMD—Exhaust Nozzle Area Demand
 WFDMD—Fuel Flow Demand
Output Variables
 FNAV—Thrust
 N2—Fan Speed
 N25—Core Speed
 P2—Fan Inlet Pressure
 PCN2—Percent Fan Speed
 PCN25—Percent Core Speed
 PP—Engine Pressure Ratio
 PS3—Compressor Discharge Static Pressure
 SM25—Core Stall Margin
 T4B—High Pressure Turbine Exit Temperature
Operational Parameters
 ALT—Altitude
 DTAMB—Ambient Temperature Deviation
 XM—Mach Number FIG. 1 illustrates a schematic of a layout of an engine 10 as well as the station designations, sensors, and actuators for engine 10. Engine 10 is an aerodynamically coupled, dual rotor machine wherein a low-pressure rotor system (fan and low-pressure turbine) is mechanically independent of a high-pressure (core engine) system. Air entering the inlet is compressed by the fan and then split into two concentric streams. One of these then enters the high-pressure compressor and proceeds through the main engine combustor, high-pressure turbine, and low-pressure turbine. The other is directed through an annular duct and then recombined with the core flow, downstream of the low-pressure turbine, by means of a convoluted chute device. The combined streams then enter the augmenter to a convergent-divergent, variable area exhaust nozzle where the flow is pressurized, expands, and accelerated rearward into the atmosphere, thus generating thrust.

The plant model is a physics based component level model (CLM) of this turbine configuration, which was developed by GE Aircraft Engines. This model is very detailed, high-fidelity, and models each component starting at the inlet, through the fan, compressor, combustor, turbines, and exhaust nozzle. Since NMPC is a model based control, an internal model is used to predict the future responses of the plant to control inputs. As the CLM is a very large and complicated model, a new model was developed to be used in the NMPC that has a small number of states, executes quickly, can be analytically linearized, and is accurate to within 20 percent transiently and 5 percent steady state over the area of the flight envelope that is most used.

The SRTM has two control inputs, fuel flow demand (WFDMD), and exhaust nozzle area demand (A8DMD), as well as ambient condition inputs; altitude (ALT), Mach (XM), and ambient temperature deviation from ISO (DTAMB). The outputs from the SRTM is all of the outputs currently used in the production control plus any other parameters such as stall margin and thrust that can be used in future studies and form the basis of the constrained operation. The outputs are, percent core speed (PCN25), percent fan speed (PCN2), fan inlet pressure (P2), fan total exit pressure (P14), fan static exit pressure (PS14), compressor inlet pressure (P25), engine pressure ratio (PP), compressor discharge static pressure (PS3), compressor discharge total pressure (P3), fan airflow (W2R), compressor airflow (W25R), fan inlet temperature (T2), compressor inlet temperature (T25), high pressure turbine exit temperature (T4B), fan stall margin (SM2), core stall margin (SM25), and thrust (FNAV).

A simplified real-time model (SRTM) of an aircraft engine along with the main fuel metering valve (MFMV) and variable exhaust nozzle (A8) actuators is developed that meets the above specifications. The model is designed to replicate both transient and steady state performance. The inertias of both rotors are considered in the SRTM because they are the main factors affecting the engine transient performance. Other states include P3 which represents something similar to combustor volume, T42 which approximates the bulk flame dynamics, two states that represent fuel actuator dynamics, and 1 state that represents the A8 actuator dynamics. The model is data driven and is designed to use the steady state relationships/data from either a complex non-linear model, or from real engine data, and then fit parameters to transient data that account for the dynamics between the inputs and the other model states.

The SRTM considers the low pressure and high pressure rotor speeds as the main energy storage components, or the states of the model. These speeds can change state if an unbalanced torque is applied. Simply put, the speed increments of the engine are the integral of the surplus torques. This is stated mathematically as $$\frac{d\omega}{dt} = \frac{1}{I}\sum_{i=1}^{N} Q_i \qquad \text{Equation 1}$$

Where $$\frac{d\omega}{dt}$$

is the rotor angular acceleration, N is the number of unbalanced torques, I is the rotor inertia, and $Q_i$ is the ith torque. The torques arise from any mismatches to the steady state relationships. For example, for a given PCN2 there is a steady state fuel flow. If the actual fuel flow is greater than the steady state relationship from PCN2 then a positive unbalanced torque will increase PCN2 dot. PCN2 dot can be similarly acted upon by the other rotor PCN25. The same logic is used on the PCN25 rotor. The other engine dynamic elements of the SRTM including T42 and PS3 act in a similar way to the rotors.

Also included in the SRTM are the inner loop and actuator dynamics for fuel flow and A8. In this part of the model there is a delay that is associated with computational delays, actuator delay, and transport delay of the fuel to the combustor. There is a gain that accounts for the change from commanded position to fuel flow. The actuator dynamics are modeled as 2nd order with rate and position limits. The A8 actuator is similar but is only 1st order actuator dynamics. Except for the FMV gain, all of the other parameters for this part of the model are found using nonlinear system identification.

Figure 2:
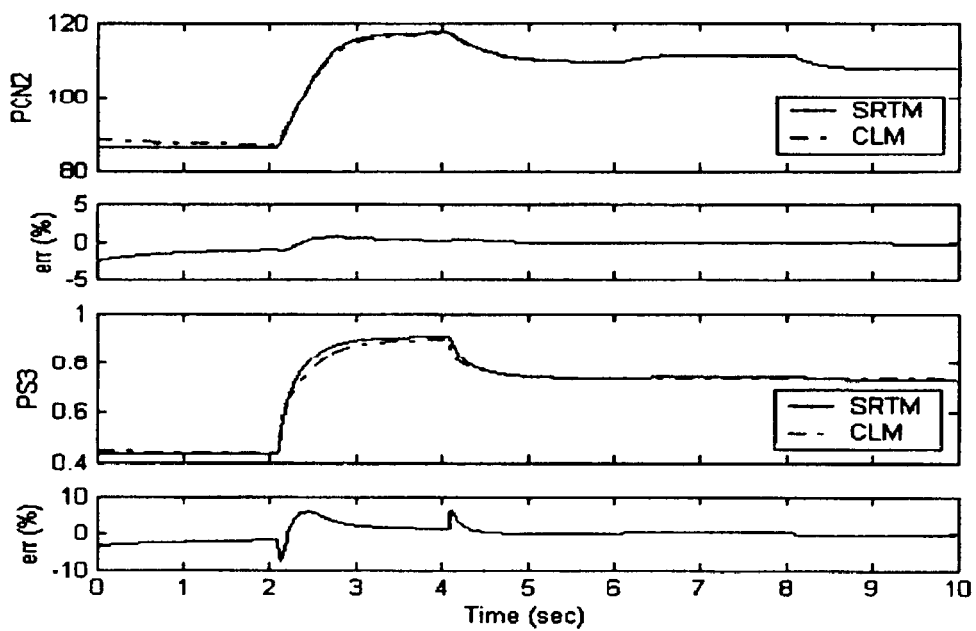
FIG. 2 illustrates a comparison of SRTM and CLM for PCN2 and PS3.

The other outputs from the model specified above are generated from table lookups based on the dynamic element outputs. For validation the SRTM is run open loop versus the CLM. The inputs profiles for the validation are a large step increase in fuel at 2 sec., small step decrease in fuel at 4 sec., small step increase in A8 at 6 sec., and a large step decrease in A8 at 8 sec. The results of one such comparison are shown in FIG. 2 for PCN2 and PS3. While for this comparison both parameters are within 10 percent transiently and 5 percent steady state, for all of the parameters over all tested points in the defined envelope the maximal deviation transiently is 22 percent and the maximal deviation steady state is 7 percent. These results are just outside of the requirements, but are still quite remarkable given the simplicity of the model structure.

These adaptive model-based control systems and methods are designed to reduce operator workload and enable autonomous gas turbine operation by: (1) providing sufficient information to the supervisory control so that the supervisory control can manage propulsion, power and/or electrical output for the given mission or event; (2) elevating the level of autonomy in the engine control; (3) aiding the integration of the engine control with the supervisory control; and/or (4) improving engine-related decision-making capabilities.

Many model-based control systems are created by designing a model of each component and/or system that is to be controlled. For example, there may be a model of each engine component and system—compressor, turbine, combustor, etc. Each model comprises features or dynamic characteristics about the component's or system's behavior over time (i.e., speed accelerations being the integral of the applied torques). From the model(s), the system may control, estimate, correct or identify output data based on the modeled information. For example, if thrust or power is lost because an actuator is stuck in a specific position, the system can hold the control to that actuator fixed as an input constraint, and then adapt the controls that are output to the other actuators so that no other constraints are violated, and as much lost thrust power as possible can be regained so that the gas turbine may can continue operation.

The models in the model-based controls are designed to replicate both transient and steady state performance. The models can be used in their non-linear form or they can be linearized or parameterized for different operating conditions. Model-based control techniques take advantage of the model to gain access to unmeasured engine parameters in addition to the normal sensed parameters. These unmeasured parameters may include thrust, stall margins, and airflows. These controls can be multiple-input multiple-output (MIMO) to account for interactions of the control loops, they are model-based to get rid of the scheduling, and they have limits or constraints built as an integral part of the control formulation and optimization to get rid of designing controllers for each limit. The current strategy for this invention involves trying to collapse the controller into an objective function(s) and constraint(s) that is used as part of a finite horizon constrained optimization problem.

The herein described methods allow either performance or operability to be optimized. If the performance-optimizing mode is selected, the objectives include attempting to maximize, minimize or track thrust, power, electricity, specific fuel consumption, part life, stress, temperatures, pressures, ratios of pressures, speed, actuator command(s), flow(s), dollars, costs, etc. This leads to longer engine run times, fuel savings, increased transient performance, increased parts life, and/or lower costs. If the operability-optimizing mode is selected, the objectives include attempting to manage stall margin, increase operability, and prevent in-flight mishaps. This leads to reduction of loss of thrust or loss of power control events, increased engine operating time in presence of faults, failures, or damage and increased engine survivability.

The herein described model-based control systems and methods that comprise a system model, estimators, and model-based control or model-predictive control. Physics-based and empirical models provide analytical redundancy of sensed engine parameters and access to unmeasured parameters for control and diagnostics purposes as well as provide prediction of future behavior of the system. Estimators associated with the various models will ensure that the models are providing accurate representations of the engine and its subsystems and components as well as estimate the model state. Nonlinear model predictive control maintains robust, high-performance control of the engine in the presence of system faults and mission segment-specific operational goals, using the predictive capabilities of model and information from the model-based diagnostics.

Because each engine is different, deteriorates, and may become faulted or damaged, the model should be able to track or adapt itself to follow these changes. One helpful idea is to get a model to reveal information about the particular engine running at the current time. This facilitates the ability to predict more accurately future behavior and to detect smaller faults or damage levels. Two areas of the model that can be modified to match the engine model to the current engine are engine parameters and states. The tool used to determine the engine parameters is called a parameter estimator, and the tool used to determine the states is a state estimator.

A parameter estimator estimates and modifies parameters in the engine model in order to reduce the error between the engine sensors and the model sensors, or this is called tracking the model to the engine. The parameters that are modified usually fall in the class called quality parameters, e.g. component efficiencies, flow, input or output scalars or adders. These quality parameters like component efficiencies can then be used as inputs to the diagnostic algorithms. For example, if the compressor efficiency drops by a couple of points during steady state operation, it may indicate damage has occurred in the compressor. In this realization the parameter estimator works in real-time on both transient information and steady state information.

A state estimator is used to also aid in tracking and is the state information is also used to initialize the model-based control at each time interval. Since the model-based control is a full state controller, it will use the estimate of the current state of the engine to initialize and function correctly. The goal of the state estimator is to determine the optimum gain K to account for the differences between the model and the engine, given the model dynamics and the covariance of w and v.

Figure 3:
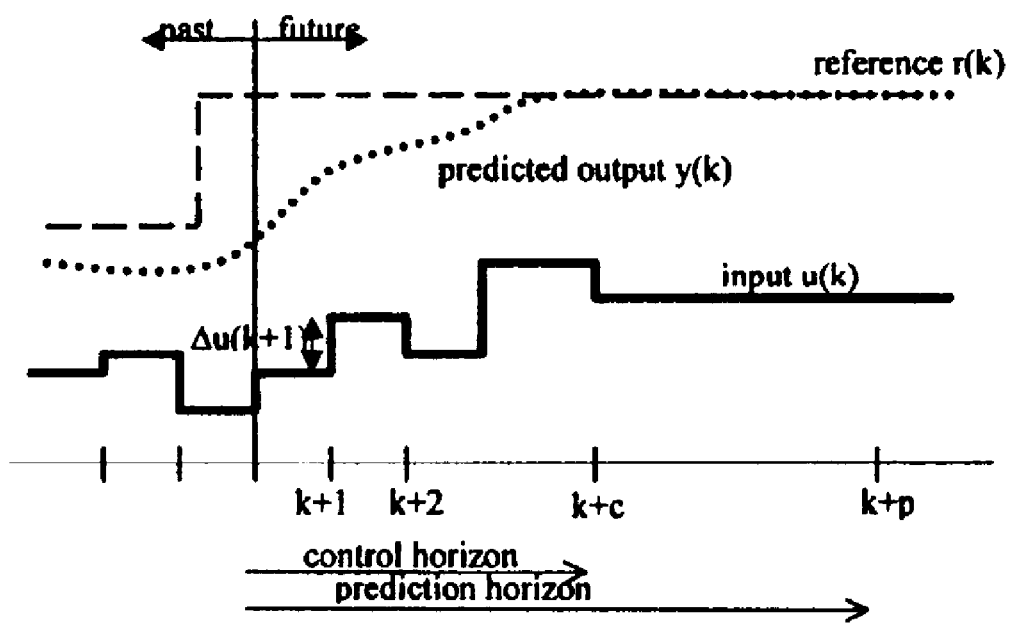
FIG. 3 illustrates an implementation of NMPC based on the constrained open-loop optimization of a finite horizon objective function.

FIG. 3 illustrates an implementation of NMPC based on the constrained open-loop optimization of a finite horizon objective function. This optimization uses a plant model to describe the evolution of the outputs and commences from an assumed known initial state. FIG. 3 illustrates the concept of receding horizon control underpinning NMPC. At time k the input variables, $\{u(k), u(k+1), \ldots, u(k+p-1)\}$, are selected to optimize a performance criterion over the prediction horizon, p. Of the computed optimal control moves, only the values for the first sample, u(k), are actually implemented. Before the next time interval and its calculation of another p input values, $\{u(k+1), u(k+2), \ldots, u(k+p)\}$, the initial state is re-estimated from output measurements. This causes the seemingly open-loop strategy actually to implement a closed-loop control.

The NMPC and the EKF state estimator are both model-based procedures in which a model of the plant is calculated for the generation of state predictions. There is a clear hierarchy of models in this specific problem, the real plant, whose dynamics are not fully known, the CLM, which is a high-fidelity but computationally complex model which is difficult to linearize, and the SRTM, which is linearizeable and relatively simply iterated as part of the optimization procedure.

In an empirical study implementing the herein described methods, the controlled inputs are fuel flow demand (WFDMD) and exhaust area demand (A8DMD). Since the control is model based it can be designed to follow the unmeasured but estimated or computed parameters of interest such as thrust and stall margin, but this studies first goal is to perform to the same requirements as the production control already running an engine. For engine 10 the references are fan speed (ref1) and engine pressure ratio (ref2). While operating to these two references, the control is constrained by other operating limitations, such as, for example, maximum T4B, minimum and maximum PS3, minimum and maximum N25, maximum N2, rotor speed acceleration, and rotor speed deceleration. Also, both actuators are rate limited and have minimum and maximum slew positions. The formulation of NMPC used to work within this framework is now detailed.

An objective function J is defined over the prediction horizon p.

$$J = \sum_{i=1}^{p} (PCN2R_i - ref\,1_i)^2 + \gamma * \sum_{i=1}^{p} (PP_i - ref\,2_i)^2 + \qquad (2)$$

$$\rho_1 * \sum_{i=1}^{p} \Delta Wf_i^2 + \rho_2 \sum_{i=1}^{p} \Delta A8_i^2 +$$

$$\delta_1 \sum_{i=1}^{p} (e^{(Ps3_i - Ps3_{max})})^2 + \delta_2 \sum_{i=1}^{p} (e^{(PCN2_i - PCN2_{max})})^2 +$$

$$\delta_3 * \sum_{i=1}^{p} (e^{(T4B_i - T4B_{max})})^2 + \delta_4 \sum_{i=1}^{p} (e^{(PCN25_i - PCN25_{max})})^2 + \cdots$$

Where $\gamma$, $\rho$, and $\delta$ are weighting factors. The SRTM is used as the predictor to obtain the turbine cycle parameters' response over the prediction horizon. The constraints on cycle parameters like PS3 and T4B are included as soft constraints or penalty functions. This is implemented by using an exponential term that is very small, i.e. little effect on J, when operating away from the constraint, but penalizes J heavily when the parameter comes near the constraint. The ΔWf and ΔA8 terms are added to both to make sure that the control does not attempt to take unfeasibly large steps, and also they are set to be just outside of the range of the actual input constraints to make sure that the gradient follows a direction that will correspond with the final solution.

A generic objective function J is defined over the prediction horizon p.

$$J = \sum_{i=1}^{p} (Y1_i - Y1ref_i)^2 + \gamma * \sum_{i=1}^{p} (Y2_i - Y2ref_i)^2 + \quad (3)$$
$$\rho_1 * \sum_{i=1}^{p} \Delta U1_i^2 + \rho_2 \sum_{i=1}^{p} \Delta U2_i^2 +$$
$$\delta_1 \sum_{i=1}^{p} (e^{(Out\ 1_{min} - Out\ 1_i)})^2 + \delta_2 \sum_{i=1}^{p} (e^{(Out\ 2_i - Out\ 2_{max})})^2 + \ldots$$

Where $\gamma$, $\rho$, and $\delta$ are weighting factors, min and max represent minimum and maximum constraints. The tracking of references (Y1, Y2, . . . ) can be any state or output parameter. The number of tracked references can be less than or equal to the number of actuator inputs U. The number of actuators in this formulation is not limited. The constraints on cycle parameters or states like Out1, Out2, . . . are included as soft constraints or penalty functions. This is implemented by using an exponential term that is very small, i.e. little effect on J, when operating away from the constraint, but penalizes J heavily when the parameter comes near the constraint. The number of constraints is not limited. The ΔU1 and ΔU2 terms are added to both to make sure that the control does not attempt to take unfeasibly large steps, and also they are set to be just outside of the range of the actual input constraints to make sure that the gradient follows a direction that will correspond with the final solution.

The control goal is $$\min_{u} J. \quad (4)$$

Where u is the vector of p future WFCMD and A8CMD control inputs. This is accomplished using a gradient descent method with central differences. The gradient computation is shown in eq. (5).

$$\nabla J = \frac{J(u+du) - J(u-du)}{2du} = \begin{vmatrix} \frac{\partial J}{\partial wfdmd_t} & \frac{\partial J}{\partial A8dmd_t} \\ \vdots & \vdots \\ \frac{\partial J}{\partial wfdmd_{t+c}} & \frac{\partial J}{\partial A8dmd_{t+c}} \\ 0 & 0 \\ \vdots & \vdots \\ 0_{t+p} & 0_{t+p} \end{vmatrix} \quad (5)$$

The control inputs are then computed by taking n steps in the negative gradient direction until J is minimized, or the maximum number of iterations or search time is reached. Projection of the inputs is applied at this time to ensure that the actuator rate and position limits are not violated. The control values are calculated using:

$$u(k+1) = u(k) - \beta^* \cdot \nabla J \quad (6)$$

Where $\beta$ is a weighting matrix that accounts for gradient step size and weighting between the two control inputs.

NMPC is a full state feedback controller and hence all states need to be measured or estimated from available measurements. Typically not all states are measured because of the cost or availability of sensors. Moreover sensors have dynamics, delays, and noise. Hence a dynamic observer is useful to reconstruct the states and reduce noise. An Extended Kalman Filter (EKF) is used for this purpose. Useful EKF's are described in Athans, M. (1996), The Control Handbook, pg. 589–594, CRC Press, United States, and B. D. O. Anderson and J. B. Moore, Optimal Filtering, Prentice-Hall, Englewood Cliffs N.J., 1979.

The EKF is a nonlinear state estimator which is based on a dynamical system model. While the model underpinning the EKF is nonlinear, the recursion is based on a linear gain computed from the parameters of the linearized model. Thus the design concepts inherit much from the realm of Kalman Filtering. In the instant implementation, the SRTM is used as the core of the EKF, which is a parallel with its use in the NMPC.

Akin to the gradient-based NMPC, the EKF need not provide the truly optimal state estimate to the controller in order to operate adequately well. It is usually a suboptimal nonlinear filter in any case. However, its role in providing the state estimates to the NMPC for correct initialisation is a key feature of NMPC which is often overlooked.

Figure 4:
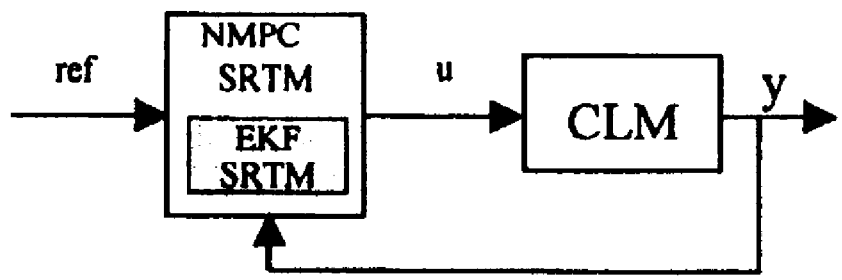
FIG. 4 illustrates a block diagram representation of how EKF, SRTM, NMPC, and CLM are connected.

The EKF and SRTM are wrapped into the NMPC logic and this is connected to the CLM for simulation or to the real engine. FIG. 4 illustrates a block diagram representation of how EKF, SRTM, NMPC, and CLM or engine are connected. The assembled control process starts with the EKF using the SRTM to determine the current state of the engine. This information is used as the initial conditions for the predictions used in the gradient calculation. The SRTM is then run 2*c times where 2 is the number of control inputs and c the control horizon used is 15 steps. The sample time is dependant upon the application, but is 10 mseconds for each time step in this application. Each run corresponds to a perturbation at a different point in the control horizon. This information is assembled into the gradient and a search path is followed in the negative gradient direction.

While NMPC can recreate the current production control, using this technology may unlock many potential benefits. Using the model based properties of NMPC can lead to running to other more attractive references like thrust and stall margin.

While the invention has been described in terms of various specific embodiments, those skilled in the art will recognize that the invention can be practiced with modification within the spirit and scope of the claims.

What is claimed is:

1. A method of designing the operations and controls of a aircraft gas turbine engine, said method comprising:
   generating an operations model for the gas turbine including at least one objective function;
   defining operations and control constraints for the operations model of the gas turbine; and
   providing an online dynamic optimizer/controller that dynamically optimizes and controls operation of the aircraft gas turbine engine using model predictive control based on the operations model and the operations and control constraints using an Extended Kalman Filter for estimation.

2. A method according to claim 1, wherein the optimizer/controller performs following steps in a loop: (A) estimating the current engine state and applicable constraints; (B) for a given control/simulation time period, determining a control action by optimizing an objective function based on the operation model while respecting the applicable constraints; (C) executing the control action determined in step (B).

3. A method according to claim 1 further comprising defining an objective J in accordance with:

$$J = \sum_{i=1}^{p}(Y1_i - Y1ref_i)^2 + \gamma * \sum_{i=1}^{p}(Y2_i - Y2ref_i)^2 +$$
$$\rho_1 * \sum_{i=1}^{p}\Delta U1_i^2 + \rho_2 \sum_{i=1}^{p}\Delta U2_i^2 +$$
$$\delta_1 \sum_{i=1}^{p}(e^{(Out\,1_{min} - Out\,1_i)})^2 + \delta_2 \sum_{i=1}^{p}(e^{(Out\,2_i - Out\,2_{max})})^2 + \ldots.$$

4. A method in accordance with claim 3 further comprising computing a gradient of J.

5. A method in accordance with claim 4 further comprising taking steps in a negative gradient direction until J is minimized.

6. A method in accordance with claim 4 further comprising taking steps in a negative gradient direction until the number of steps equals a predetermined number.

7. A method in accordance with claim 4 further comprising taking steps in a negative gradient direction until an elapsed time exceeds a predetermined time interval.

8. A system for designing the operations and controls of an aircraft gas turbine engine, said system comprising:
a computing unit with an input unit for generating an operations model for the aircraft gas turbine engine to include at least one objective function and for defining operations and controls constraints for the operations model of the aircraft gas turbine engine; and
a dynamic online optimizer/controller configured to dynamically optimize and control operation of the gas turbine using model predictive control based on the operations model and the operations and control constraints using an Extended Kalman Filter for estimation.

9. A system according to claim 8, wherein said optimizer/controller is configured to perform the following steps in a loop: (A) estimating the current engine state and applicable constraints; (B) for a given control/simulation time period, determining a control action by optimizing an objective function based on the operation model while respecting the applicable constraints; (C) executing the control action determined in step (B).

10. A system in accordance with claim 8 wherein said optimizer/controller is configured to compute the gradient of J wherein:

$$J = \sum_{i=1}^{p}(Y1_i - Y1ref_i)^2 + \gamma * \sum_{i=1}^{p}(Y2_i - Y2ref_i)^2 +$$
$$\rho_1 * \sum_{i=1}^{p}\Delta U1_i^2 + \rho_2 \sum_{i=1}^{p}\Delta U2_i^2 +$$
$$\delta_1 \sum_{i=1}^{p}(e^{(Out\,1_{min} - Out\,1_i)})^2 + \delta_2 \sum_{i=1}^{p}(e^{(Out\,2_i - Out\,2_{max})})^2 + \ldots.$$

11. A system in accordance with claim 10 wherein said optimizer/controller is configured to traverse the gradient in a negative direction until a number of steps equals a predetermined number.

12. A system in accordance with claim 10 wherein said optimizer/controller is configured to traverse the gradient in a negative direction until J is minimized.

13. A system in accordance with claim 10 wherein said optimizer/controller is configured to traverse the gradient in a negative direction until an elapsed time exceeds a predetermined time interval.

14. A non-linear model-based control method for controlling propulsion in a aircraft gas turbine engine, the method comprising:
a) obtaining information about the current state of the engine using an Extended Kalman Filter;
b) updating model data information about the engine in an model-based control system to reflect the current state of the engine;
c) comparing the information about the current state of the engine with the model data information about the engine in the model;
d) determining the optimal corrective action to take given the current state of the engine, the objective function, and the constraints of the engine;
e) outputting a control command to implement the optimal corrective action; and
f) repeating steps a)–e) as necessary to ensure the performance of the engine is optimized at all times.

15. A method in accordance with claim 14 wherein said obtaining current information comprises defining an objective J in accordance with:

$$J = \sum_{i=1}^{p}(Y1_i - Y1ref_i)^2 + \gamma * \sum_{i=1}^{p}(Y2_i - Y2ref_i)^2 +$$
$$\rho_1 * \sum_{i=1}^{p}\Delta U1_i^2 + \rho_2 \sum_{i=1}^{p}\Delta U2_i^2 +$$
$$\delta_1 \sum_{i=1}^{p}(e^{(Out\,1_{min} - Out\,1_i)})^2 + \delta_2 \sum_{i=1}^{p}(e^{(Out\,2_i - Out\,2_{max})})^2 + \ldots.$$

16. A method in accordance with claim 15 further comprising computing a gradient of J.

17. A method in accordance with claim 16 further comprising taking steps in a negative gradient direction until J is minimized.

18. A method in accordance with claim 16 further comprising taking steps in a negative gradient direction until the number of steps equals a predetermined number.

19. A method in accordance with claim 16 further comprising taking steps in a negative gradient direction until an elapsed time exceeds a predetermined time interval.

20. A method in accordance with claim 16 further comprising taking steps in a negative gradient direction until a first to occur of:
J is minimized;
the number of steps equals a predetermined number; and
an elapsed time exceeds a predetermined time interval.

* * * * *

UNITED STATES PATENT AND TRADEMARK OFFICE
CERTIFICATE OF CORRECTION

PATENT NO. : 6,823,253 B2
DATED : November 23, 2004
INVENTOR(S) : Brent Jerome Brunell It is certified that error appears in the above-identified patent and that said Letters Patent is hereby corrected as shown below:

Column 1,
Line 4, add
-- STATEMENT REGARDING FEDERALLY SPONSORED RESEARCH & DEVELOPMENT
This invention was made with Government support under contract number F3361-98-C-2901 awarded by the United States Air Force. The Government has certain rights in the invention. --

Column 7,
Line 21, add $\delta_3 * \sum_{i=1}^{p} (e^{(T4B_{m}-T4B_i)})^2 + \delta_4 \sum_{i=1}^{p} (e^{(PCN25_m - PCN25_i)})^2 + \ldots$ Column 9,
Line 16, add $\delta_3 * \sum_{i=1}^{p} (e^{(T4B_{m}-T4B_i)})^2 + \delta_4 \sum_{i=1}^{p} (e^{(PCN25_m - PCN25_i)})^2 + \ldots$ Line 61, add $\delta_3 * \sum_{i=1}^{p} (e^{(T4B_{m}-T4B_i)})^2 + \delta_4 \sum_{i=1}^{p} (e^{(PCN25_m - PCN25_i)})^2 + \ldots$ Column 10,
Line 42, add $\delta_3 * \sum_{i=1}^{p} (e^{(T4B_{m}-T4B_i)})^2 + \delta_4 \sum_{i=1}^{p} (e^{(PCN25_m - PCN25_i)})^2 + \ldots$ Signed and Sealed this Twenty-first Day of June, 2005

JON W. DUDAS
*Director of the United States Patent and Trademark Office*